United States Patent [19]
Johnson et al.

[11] 4,372,641
[45] Feb. 8, 1983

[54] OPTICAL WAVEGUIDE TERMINATION

[75] Inventors: Leo F. Johnson, Bedminster; LeGrand G. Van Uitert, Morris Township, Morris County, both of N.J.

[73] Assignee: Bell Telephone Laboratories, Incorporated, Murray Hill, N.J.

[21] Appl. No.: 163,789

[22] Filed: Jun. 27, 1980

[51] Int. Cl.³ .............................................. G02B 5/14
[52] U.S. Cl. .................................. 350/96.12; 350/96.1
[58] Field of Search ................ 350/96.1, 96.11, 96.12, 350/96.13

[56] References Cited
U.S. PATENT DOCUMENTS 3,185,945  5/1965  Wright, Jr. ........................ 333/81
3,948,583  4/1976  Tien ................................... 350/96.11

OTHER PUBLICATIONS

S. E. Miller, "Integrated Optics: An Introduction", Bell System Technical Journal, vol. 48 (1969) pp. 2059–2069.
E. G. Spencer et al, "Ion-Beam Techniques for Device Fabrication" Journal of Vacuum Science and Technology, vol. 8, 1972, pp. 552–570.

*Primary Examiner*—David K. Moore
*Attorney, Agent, or Firm*—Peter A. Businger

[57] ABSTRACT

Optical communications networks may be implemented by means of a patterned layer of an optically transparent material on a substrate. Where an optical path terminates, e.g., at an on-off switch, it is desirable to optically terminate a waveguide so as to minimize spurious signals due to reflection.

The invention provides for optical termination of a waveguide by essentially complete absorption of light. Absorption is effected in a portion of the waveguide which comprises light absorbing centers such as, e.g., carbon or metal particles, anions, cations, or molecules which absorb light at desired wavelengths. Absorbing centers may be comprised in a central portion of a waveguide or, more conveniently, in a portion adjacent to a central portion. In the interest of minimizing reflections, interaction between light and absorbing centers increases gradually in a direction of light propagation as may be due to gradually increasing concentration of absorbing centers or to taper in a waveguide cladding portion, core portion, or absorbing portion.

13 Claims, 8 Drawing Figures

OPTICAL WAVEGUIDE TERMINATION

TECHNICAL FIELD

The invention is concerned with optical communications devices.

BACKGROUND OF THE INVENTION

Availability of sources of coherent electromagnetic radiation at wavelengths in the range of 0.5-15 micrometers and of waveguides for transmitting such radiation has produced widespread interest in the use of light as a communications medium. Proposed optical communications systems may comprise light sources, waveguides, and active components such as, e.g., modulators, deflectors, and switches. Waveguides may be of a type known as optical fibers or else they may take the form of patterned transparent films on a substrate, the latter type being particularly suited for miniaturized, highly complex systems.

Such systems are described, e.g., by S. E. Miller, "Integrated Optics: An Introduction", *Bell System Technical Journal*, Vol. 48 (1969), pp. 2059-2069, and they may be manufactured by exemplary techniques as described by E. G. Spencer et al., "Ion-Beam Techniques for Device Fabrication", *Journal of Vacuum Science and Technology*, Vol. 8 (1972), pp. S52-S70.

Active components for integrated optical circuits have been proposed based on a variety of physical effects such as, e.g., electro-optical, magneto-optical, and acousto-optical interaction; among electro-optical devices are devices which are based on electrochromic and electroplating action as disclosed, respectively, in U.S. patent applications Ser. No. 973,162 and 973,188, filed Dec. 26, 1978 by L. F. Johnson et al.

It is recognized that photodetectors in optical communications systems are capable of operating over a wide range of power levels. This is in contrast to crystal detectors in microwave communications systems which may preferably be protected by power limiters comprising microwave attenuators as disclosed in U.S. Pat. No. 3,185,945, issued May 25, 1965 to W. H. Wright. There are instances, however, where it may be desirable to optically terminate a waveguide such that signals are removed from a network without the introduction of spurious signals as may be produced by reflection at a terminal.

SUMMARY OF THE INVENTION

The invention provides for optical termination of a waveguide by essentially complete absorption of light. Absorption is effected in a portion of a waveguide which comprises light absorbing centers such as, e.g., carbon or metal particles, anions, cations, atoms, or molecules which absorb light at one or several wavelengths. Light absorbing centers may be comprised in a central portion of a waveguide or, more conveniently, in an adjacent lower-index portion. Gradually increasing interaction between light and absorbing centers may result from an increase in concentration of centers in a direction of light propagation or from a waveguide core, cladding, or absorbing portion being tapered.

Terminations according to the invention, in combination with an electroresponsive coupler, may be used in optical communications networks, e.g., to provide for reflection-free switching.

DETAILED DESCRIPTION

Devices of the invention comprise a substrate supported waveguide, guiding of radiation being due to a difference in refractive index in a higher index central portion and a lower index adjacent portion or medium. For example, and as shown in FIGS. 1-8, a waveguide may have central portion 1 which is deposited on substrate 4. The refractive index of the material of substrate 4 is less than the refractive index of the material of central portion 1; similarly, the refractive index of the material of adjacent or "cladding" portion 2 of the waveguide is less than the refractive index of the material of central portion 1.

Central portion may be conveniently defined in terms of limited decrease of refractive index in directions away from a center line of such portion. While such limitation may preferably be to as little as 0.01 percent, limitation to approximately 0.1 percent is more typical. In the context of the invention, limitation to approximately 1 percent represents a preferred widest range. Transition between a central portion and a cladding portion may take the form, e.g., of a discrete interface, of a gradual change in refractive index, or of a number of steps approximating a gradual change. Waveguides typically have semicircular or rectangular cross section and may be completely or partially embedded in a substrate. Cladding may be absent, e.g., where a waveguide is exposed to ambient air or other lower index medium.

According to the invention, light absorbing portion 3 shown in FIGS. 1-8 comprises light absorbing centers which absorb light at one or several wavelengths. Such absorbing centers in a waveguide material may be vacancies, substitutional or interstitial atoms, ions, or molecules, or impurities such as, e.g., carbon or metal particles. Combination of different types of absorbing centers is not precluded.

Figure 1:
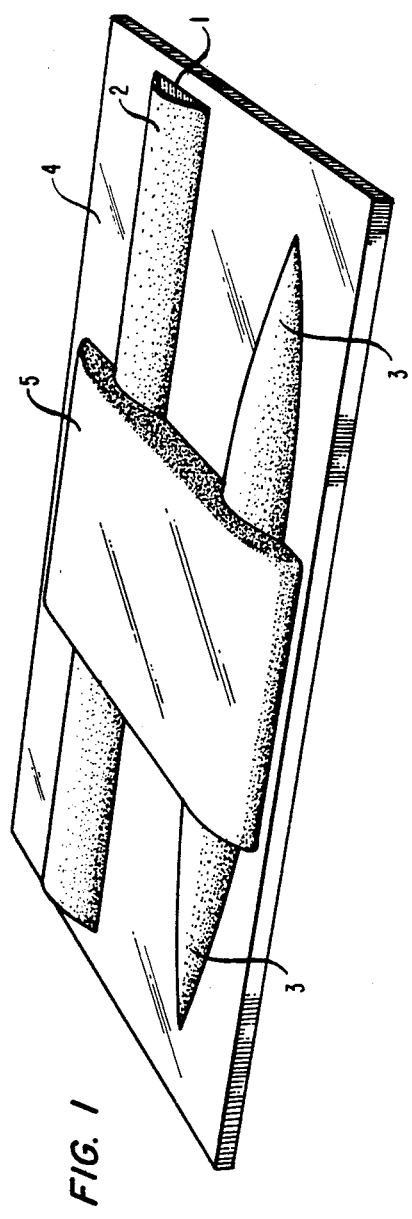
FIG. 1 is a schematic and enlarged perspective view of a portion of an optical communications network which incorporates an optical coupler and two optical waveguide terminations according to the invention.
Figure 2:
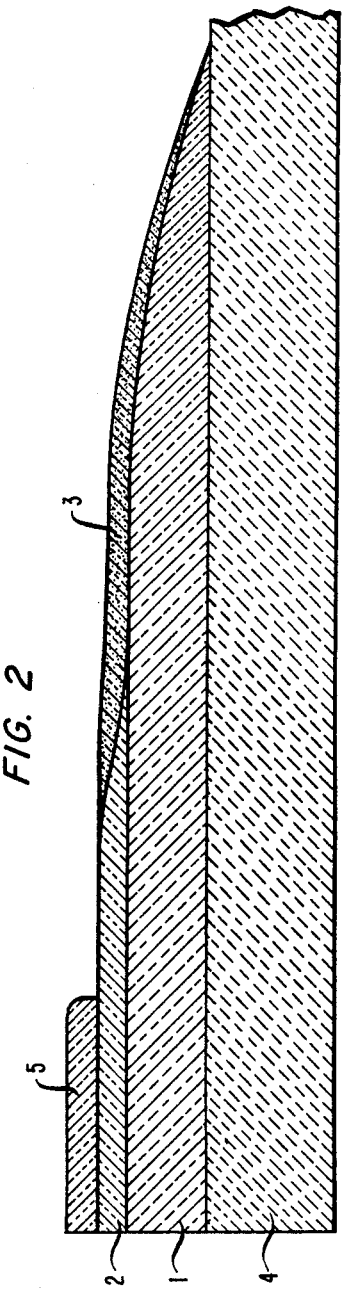
FIG. 2 is a schematic cross-sectional view of an optical waveguide termination shown in FIG. 1.

Incorporation of an optical termination according to the invention is illustrated in FIG. 1 which schematically shows a portion of an optical communication network comprising an electro-optical on-off switch. Specifically, FIG. 1 shows a first waveguide having central portion 1 and cladding portion 2, and a second waveguide which is optically coupled to the first waveguide by means of electroresponsive medium 5. A partial cross section of the second waveguide is shown in FIG. 2. The second waveguide is tapered at both ends and comprises absorbing portion 3. Depending on a voltage placed across medium 5, light traveling in either direction in the first waveguide may be coupled into the second waveguide. Light coupled into the second waveguide is absorbed in absorbing portion 3.

Figure 3:
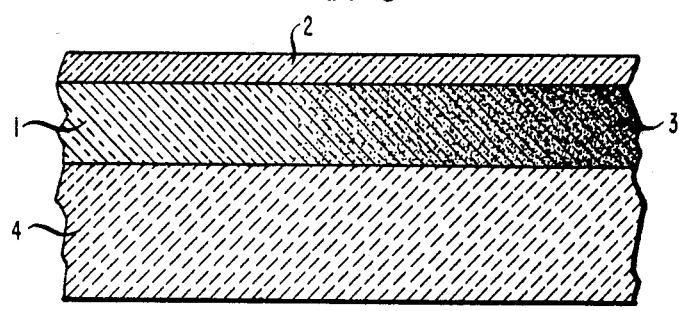
FIGS. 3-8 are schematic and enlarged cross sections of alternate embodiments of optical waveguide terminations according to the invention.
Figure 4:
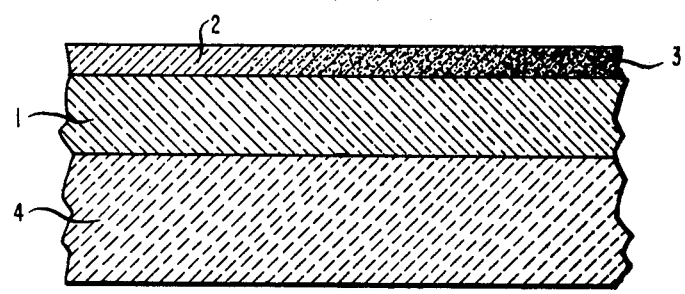
Figure 5:
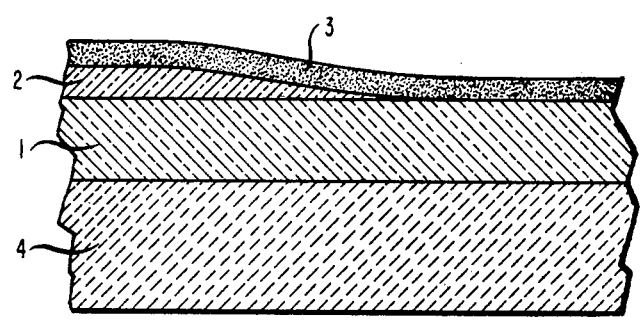
Figure 6:
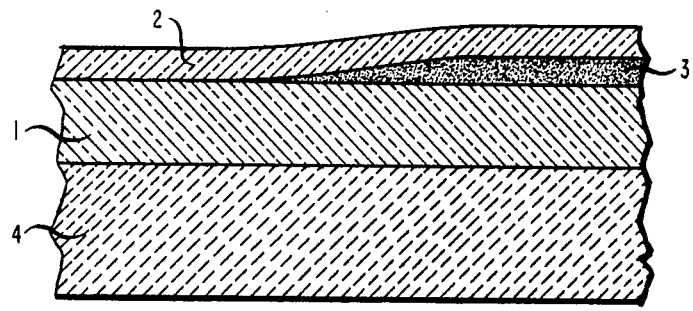
Figure 7:
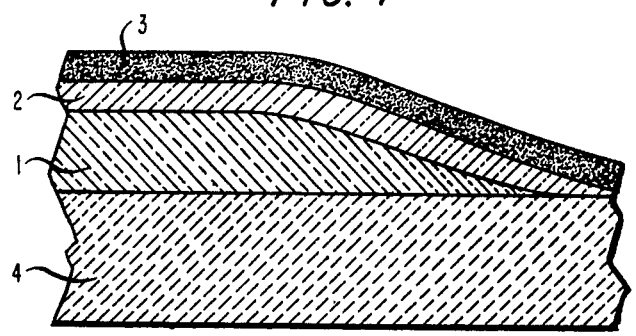
Figure 8:
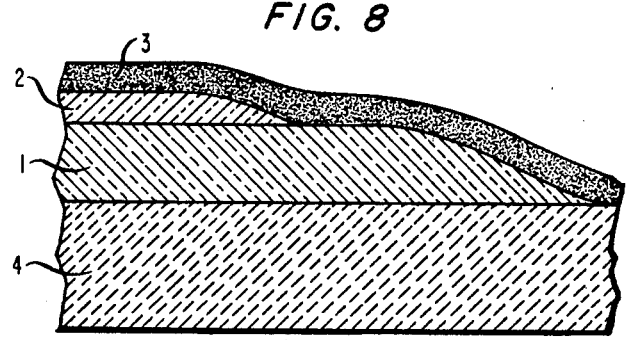

As shown in FIG. 3, light absorbing centers may be comprised in a central portion of a waveguide. Or, as shown in FIG. 4, such centers may be comprised in an adjacent portion. In both instances, concentration of absorbing centers in an absorbing portion increases gradually in a direction of light propagation (from left to right in the figures), resulting in gradually increasing interaction between light and absorbing centers. Gradually increasing interaction may alternately be the result of taper in a cladding portion, absorbing portion, or core portion as illustrated, respectively, in FIGS. 5-7. A combination of tapered portions is shown in FIG. 8; combination of tapered structure with graded concentration is not precluded. Also, concentration of light absorbing centers may be graded in directions away from a centerline of a waveguide.

Interaction between absorbing centers and light is sufficient to result in attenuation of at least 30 decibel over a distance which preferably is less than or equal to 10 centimeter or, more typically, less than or equal to 1 centimeter. In the interest of minimizing reflection, such distance is preferably greater than or equal to 0.1 millimeter or, more typically, greater than or equal to 1 millimeter. Taper is preferably small and preferably limited such that the direction of light propagation meets a tapered surface at an angle which is less than or equal to 10 degrees.

As contrasted with an embodiment according to FIG. 3, embodiments of the invention according to FIGS. 4-8 are effective primarily due to interaction of an evanescent field with radiation absorbing centers which are adjacent to a waveguide central portion. Such configuration is advantageous in view of more convenient manufacture of devices, e.g., by methods involving masking and deposition of glass layers as is more specifically exemplified below.

A convenient way of producing a tapered termination is as follows: A mask is deposited on a substrate, leaving exposed a desired optical path whose width diminishes to a point. Sidewalls of the mask may be straight or undercut. Waveguide material such as, e.g., an appropriate glass is deposited through the mask, e.g., by electron beam deposition. Due to shadowing, reduced deposition occurs towards the walls and the tip of the termination, thereby causing tapering of the termination not only laterally, but also in a direction perpendicular to the substrate.

Deposition of a cladding glass is in the presence of a mask which covers the tapered portion of waveguide 1. Cladding thickness is typically in the range of from 100 to 10,000 Angstrom. The mask is removed, a complementary mask is applied, and an appropriate absorbing material is electron beam deposited along with additional cladding glass, thereby forming absorber medium 3.

Alternate manufacturing procedures may involve the use of gamma radiation or X-rays to locally reduce PbO to elemental lead in PbO-containing glass. Grading of lead concentration may be as obtained when a focused radiation source is held stationary or as produced by moving a beam at varying velocity. Lead or other transition elements may also be incorporated in a glass by ion implantation, followed optionally by laser annealing.

EXAMPLE 1.

Silica glass waveguides are deposited by sputtering from a silica glass target. An absorber medium is deposited by co-sputtering from elemental lead and silica glass targets.

EXAMPLE 2.

Silica glass waveguides are deposited by electron beam deposition. An absorber medium is deposited by vapor deposition of lead from a separate source while electron beam deposition of silica glass continues. Grading of lead concentration may be effected by regulation of temperature during evaporation of elemental lead from a crucible.

EXAMPLE 3.

Lead silicate glass is deposited by sputtering from a lead silicate, $PbO-SiO_2$ target in an oxygen-free atmosphere. An absorber medium is deposited by sputtering from the same targets while oxygen presence is increased so as to partially oxidize sputtered lead to the tetravalent state.

EXAMPLE 4.

Silica glass waveguides are deposited by sputtering from a silica glass target. An absorber medium is produced by co-sputtering from a silica target and a silica plus metal mixture as a metal source.

EXAMPLE 5.

Silica glass waveguides are electron beam deposited. An absorber medium is deposited by combined electron beam deposition of silica glass and evaporation of elemental iron.

EXAMPLE 6.

Silica glass waveguides are electron beam deposited. An absorber medium is deposited by combined electron beam deposition of silica glass and evaporation of iron oxide.

EXAMPLE 7.

Silica glass waveguides are sputtered. A carbon containing absorber medium is deposited by combined sputter deposition of silica and deposition of carbon by passing methane gas through the plasma, carbon being formed upon dissociation of methane into carbon and hydrogen.

EXAMPLE 8.

Silica glass waveguides are deposited by sputtering from a silica glass target. An absorber medium is produced by reactive sputtering of elemental silicon in an oxygen-argon atmosphere. Partial pressure oxygen is decreased from an initially high level so as to gradually increase concentration of deposited light absorbing elemental Si or $Si^{++}$ (as in SiO).

We claim:

1. Optical communications device comprising a substrate-supported waveguide which is elongated in a direction of light propagation and which comprises a central portion in which index of refraction decreases by less than 1 percent in directions away from a center line of said central portion, said device being characterized in that a portion of said waveguide, here designated as an absorbing portion, comprises absorbing centers which absorb optical radiation at one or several wavelengths, said absorbing centers being present in said portion so as to result in gradually increasing interaction between said absorbing centers and light propagating in said direction and said absorbing centers being present in said portion in an amount sufficient for attenuation of said radiation by at least 30 decibel over a distance which is less than or equal to 10 centimeter and greater than or equal to 0.1 millimeter.

2. Device of claim 1 in which said distance is less than or equal to 1 centimeter and greater than or equal to 1 millimeter.

3. Device of claim 1 in which said absorbing portion is comprised in said central portion and in which concentration of absorbing centers increases gradually in said direction.

4. Device of claim 1 in which said absorbing portion is comprised in a cladding portion on said core portion and in which concentration of absorbing centers increases gradually in said direction.

5. Device of claim 1 in which said absorbing portion is on a cladding portion whose thickness diminishes in said direction.

6. Device of claim 1 in which said absorbing portion is on said core portion and in which thickness of said absorbing portion increases in said direction.

7. Device of claim 1 in which said absorbing portion is on a cladding portion which is on a central portion whose thickness diminishes in said direction.

8. Device of claim 7 in which tapering is such that said direction of light propagation meets the interface between said central portion and said cladding portion at an angle which is less than or equal to 10 degrees.

9. Device of claim 1 in which said absorbing centers are metal particles.

10. Device of claim 1 in which said absorbing centers are carbon particles.

11. Device of claim 1 in which said absorbing centers are substitutional atoms, ions, or molecules.

12. Device of claim 1 in which said absorbing centers are interstitial atoms, ions, or molecules.

13. Device of claim 1 in which said absorbing centers are vacancies.

* * * * *